US012066631B2

(12) United States Patent
Hoekman et al.

(10) Patent No.: US 12,066,631 B2
(45) Date of Patent: Aug. 20, 2024

(54) CONTROL OF DIFFRACTION ARTIFACTS IN AUGMENTED REALITY DISPLAY USING VIEW CONTROL LAYER

(71) Applicant: GOOGLE LLC, Mountain View, CA (US)

(72) Inventors: Thomas Hoekman, Redwood City, CA (US); Joseph Daniel Lowney, Tucson, AZ (US); Alexander Y. Zhu, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/096,910

(22) Filed: Jan. 13, 2023

(65) Prior Publication Data
US 2024/0241374 A1  Jul. 18, 2024

(51) Int. Cl.
*G02B 27/44* (2006.01)
*G02B 27/01* (2006.01)
*G02B 27/28* (2006.01)
*G02B 5/20* (2006.01)

(52) U.S. Cl.
CPC ....... *G02B 27/0172* (2013.01); *G02B 27/288* (2013.01); *G02B 27/44* (2013.01); *G02B 5/203* (2013.01); *G02B 2027/0178* (2013.01)

(58) Field of Classification Search
CPC .. G02B 27/0172; G02B 27/288; G02B 27/44; G02B 5/203; G02B 2027/0178
See application file for complete search history.

(56) References Cited

U.S. PATENT DOCUMENTS

| 11,249,310 | B1 | 2/2022 | Kitain et al. |
| 2010/0201242 | A1 | 8/2010 | Liu et al. |
| 2020/0209453 | A1 | 7/2020 | Kwon et al. |
| 2022/0137278 | A1 | 5/2022 | Lee et al. |
| 2022/0197026 | A1* | 6/2022 | Grant ............... G02B 6/0036 |
| 2023/0142054 | A1* | 5/2023 | Qaderi ............... G03H 1/268 359/23 |

FOREIGN PATENT DOCUMENTS

| CN | 110764260 A | 2/2020 |
| CN | 112567269 A | 3/2021 |

* cited by examiner

*Primary Examiner* — Towfiq Elahi

(57) ABSTRACT

Techniques are described in which a view control layer is optically coupled to a waveguide having one or more diffraction structures. The view control layer selectively prevents light rays from interfacing with at least one diffraction structure of the waveguide based on a respective angle of incidence at which the light rays encounter the view control layer. In various embodiments, the view control layer may include a light control film, a polarization stack, and/or a dielectric stack angular filter.

17 Claims, 8 Drawing Sheets

CONTROL OF DIFFRACTION ARTIFACTS IN AUGMENTED REALITY DISPLAY USING VIEW CONTROL LAYER

BACKGROUND

Some augmented reality (AR) display systems employ a projector, which is an optical device that projects or shines a pattern of light onto another object (e.g., onto a surface of another object, such as onto a projection screen or retina) in order to display an image or video on or via that other object. In such AR projection display systems, light is temporally modulated to provide a pattern of light, which is spatially distributed over a two-dimensional display area. The spatial distribution of the modulated pattern of light produces an image at the display area, interfering with the presentation of intended content as well as with the uniformity of colors provided by the display.

Approaches for improving uniformity of displayed colors in AR displays have included using improved backlights with more uniform light output, using multiple backlights to provide more uniform illumination, using color filters or spatial light modulators to adjust the color and intensity of the displayed light, and using advanced image processing algorithms to correct for any color non-uniformities in the display. Each of these techniques is associated with various disadvantages.

BRIEF SUMMARY OF EMBODIMENTS

In an embodiment, a wearable heads-up display (WHUD) device comprises a waveguide having one or more diffraction structures, an eye side configured to face an eye of a user, and a world side substantially opposite the eye side; and a view control layer optically coupled to the world side of the waveguide, the view control layer to selectively prevent light rays from interfacing with at least one diffraction structure of the one or more diffraction structures based on a respective angle of incidence at which the light rays encounter the view control layer.

The view control layer may comprise at least one light control film.

The view control layer may comprise a polarization stack.

The view control layer may comprise a dielectric stack angular filter.

The WHUD device may further comprise one or more lenses coupled to the waveguide. The view control layer may be optically coupled to a world side lens of the one or more lenses.

The diffraction structures may include an outcoupler of the waveguide.

To selectively prevent the light rays from interfacing with the at least one diffraction structure may include to prevent light rays from interfacing with the at least one diffraction structure based on the respective angle of incidence being greater than a threshold angle of incidence.

In an embodiment, a method comprises receiving display light representative of an image for display; directing the display light to propagate within a waveguide via one or more diffraction structures, the waveguide having an eye side configured to face an eye of a user and a world side substantially opposite the eye side; and selectively preventing, via a view control layer optically coupled to the world side of the waveguide, light rays from interfacing with at least one diffraction structure of the one or more diffraction structures based on a respective angle of incidence at which the light rays encounter the view control layer.

The view control layer may comprise at least one light control film. The method may further include configuring a pitch and depth of one or more micro-louvers of the light control film to select a threshold angle of incidence for the view control layer.

The view control layer may comprise a polarization stack.

The view control layer may comprise a dielectric stack angular filter.

One or more lenses may be coupled to the waveguide, such that the view control layer is optically coupled to a world side lens of the one or more lenses.

The at least one diffraction structure may comprise an outcoupler of the waveguide.

Selectively preventing the light rays from interfacing with the at least one diffraction structure may include preventing light rays from interfacing with the at least one diffraction structure based on the respective angle of incidence being greater than a threshold angle of incidence.

In an embodiment, a lens stack comprises a waveguide having one or more diffraction structures; and a view control layer optically coupled to the waveguide, the view control layer to selectively prevent light rays from interfacing with at least one diffraction structure of the one or more diffraction structures based on a respective angle of incidence at which the light rays encounter the view control layer.

The view control layer may comprise one or more of a group that includes a light control film, a polarization stack, or a dielectric stack angular filter.

To selectively prevent the light rays from interfacing with the at least one diffraction structure based on an angle of incidence may include to prevent light rays from interfacing with the at least one diffraction structure based on the respective angle of incidence being greater than a threshold angle of incidence.

The waveguide may have an eye side configured to face an eye of a user and a world side substantially opposite the eye side, such that the view control layer is optically coupled to the world side of the waveguide.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Rainbow artifacts and other visual artifacts may result from external light sources when using diffractive backlights in some AR display systems. Such visual artifacts are caused by the manner in which diffractive backlights split light into its component color wavelengths, which in certain scenarios cause each of those component color wavelengths to be displayed at a slightly different angle. Such rainbow artifacts may result from external light sources in an AR display device user's peripheral vision (e.g., sunlight or overhead office lighting) diffracting off of one or more diffraction gratings of the AR display device. This can be a distracting and unpleasant experience for the user (especially when the user moves their head or the AR display device itself), and can reduce the perceived quality of the AR display.

Figure 1:
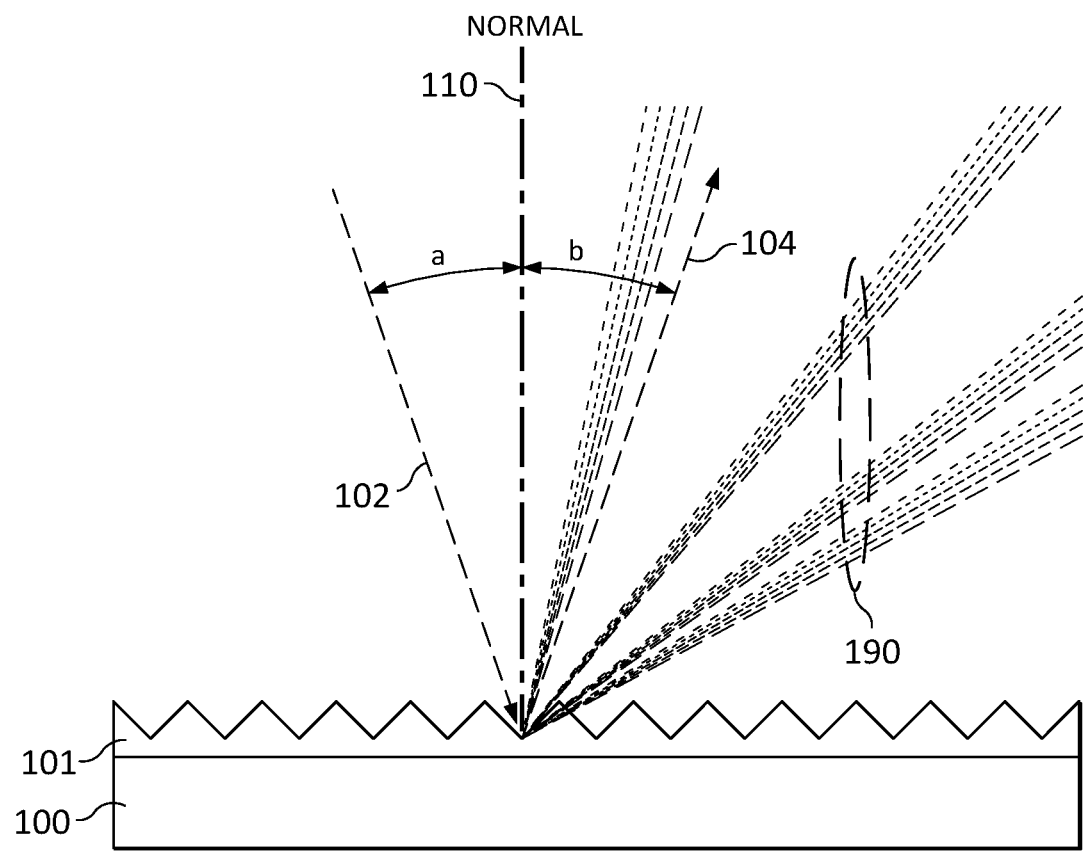
FIG. 1 illustrates a first diffraction artifact scenario in which an arbitrary multifrequency light ray interfaces with a diffraction structure at a relatively low angle of incidence.

FIG. 1 illustrates a diffraction artifact scenario in which an arbitrary multifrequency light ray 102 interfaces with a diffraction structure 101 at a relatively low angle of incidence a. The diffraction structure 101 may comprise, as non-limiting examples, one or more diffraction gratings, holograms, volume diffraction gratings, volume holograms, surface relief diffraction gratings, or surface relief holograms. The diffraction structure 101 is disposed on (or included as part of) an optical substrate 100, such as in use as at least part of an optical waveguide. A portion of the light ray 102 bounces off of the diffraction structure 101 as an intended reflection ray 104 at an angle of incidence b, which is substantially equal to the angle of incidence a with respect to a surface normal 110 of the diffraction structure 101. However, multiple rainbow diffraction artifacts 190 have also been formed as a result of the interface of light ray 102 with facet surfaces of the diffraction structure 101. In addition to potentially distracting a user and detracting from the uniformity of displayed colors in a corresponding AR display, such diffraction artifacts reduce the amount of light intentionally transmitted by the waveguide, reducing its perceived transparency.

Figure 2:
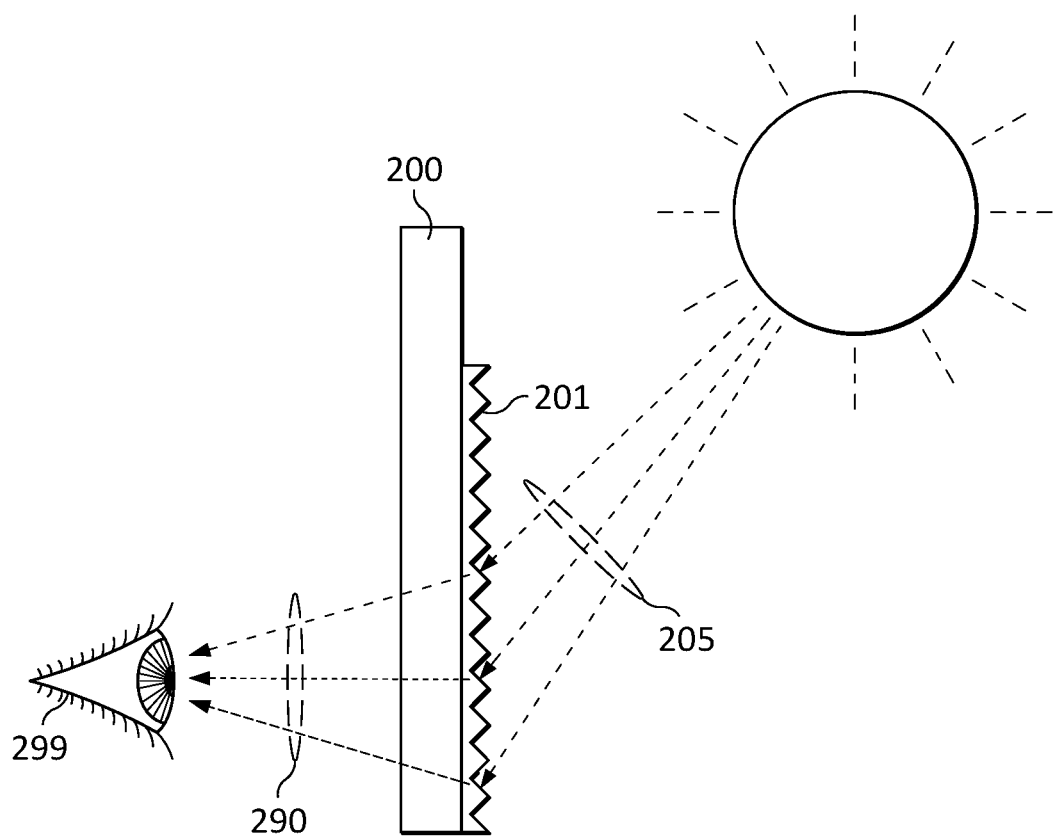
FIG. 2 illustrates a second diffraction artifact scenario, in which rays of sunlight interface with a diffraction structure at a relatively high angle of incidence.

FIG. 2 illustrates a second diffraction artifact scenario, in which rays of sunlight 205 interface with a diffraction structure 201 at a relatively high (e.g., oblique) angle of incidence with respect to a surface normal (not shown) of an optical waveguide 200, on or in which the diffraction structure 201 is disposed. As the sunlight 205 interacts with the diffraction structure 201, different component wavelengths (colors) of some portion of the sunlight 205 are diffracted at different angles towards an eye 299 of a user, forming rainbow diffraction artifacts 290.

In an augmented reality (AR) display system, the exit pupil is the location at which the virtual content to be viewed by the user is viewed by the user, such as the point at which the virtual content is projected onto the user's retina. The purpose of the exit pupil is to provide a clear and comfortable viewing experience for the user, so that the virtual content appears in focus and appears to be at a comfortable distance from the user. Expanding a size of the exit pupil is advantageous in order to accommodate different users and different viewing conditions (e.g., bright or dim lighting).

Light control films (also termed the view control films) are thin, transparent films that operate as angular filters in displays, including augmented reality (AR) displays. Such films are designed to selectively block or transmit light depending on the angle at which the light is incident on the film. Light control films can be useful in AR display in order to control a directionality of the displayed light to produce high-quality images. By using light control films as angular filters, the relevant AR display may improve the uniformity of displayed colors and reduce the occurrence of rainbow artifacts. Light control films are typically made from materials such as polycarbonate or acrylic, and may be coated with special optical coatings to enhance their light-blocking or light-transmitting properties. One type of light control film is the micro louver film, which contains an array of microscopic vertical louvers that act as angular filters for the light. In certain scenarios, such micro louvers are arranged in a grid formation and spaced very closely together, with each louver blocking light that is incident at a certain angle and transmitting light that is incident at a different angle.

Embodiments of techniques described herein reduce the occurrence of visual artifacts in an AR display device (including rainbow diffraction artifacts) via a view control layer. The view control layer limits a range of angles of incidence from which external light beams are allowed to pass through a waveguide combiner of the AR display device to be perceived by a user (e.g., in an exit pupil of the AR display). The view control layer reduces the transmission of high-angle light beams (those with relatively high angles of incidence as measured with respect to a normal of the world side surface of the waveguide) to the diffraction gratings of the waveguide, while allowing a high transmission rate in the center of a user's field of view (FOV).

In certain embodiments, a view control layer comprising one or more light control films is disposed on a world side of a lens element of a wearable heads-up display (WHUD) device to selectively absorb or reflect high-angle light beams away from the waveguide. In this manner, the view control layer prevents diffraction artifacts that would otherwise result from those light beams interfacing with one or more diffraction structures of the waveguide. In other embodiments, the view control layer may comprise other elements, such as a polarization stack (a set of one or more polarization films and/or half-wave plates), a dielectric stack angular filter, or other angular optical filters.

Although some embodiments of the present disclosure are described and illustrated herein with reference to a particular example near-eye display system in the form of a WHUD, it will be appreciated that the apparatuses and techniques of the present disclosure are not limited to this particular example, but instead may be implemented in any of a variety of display systems using the guidelines provided herein.

Figure 3:
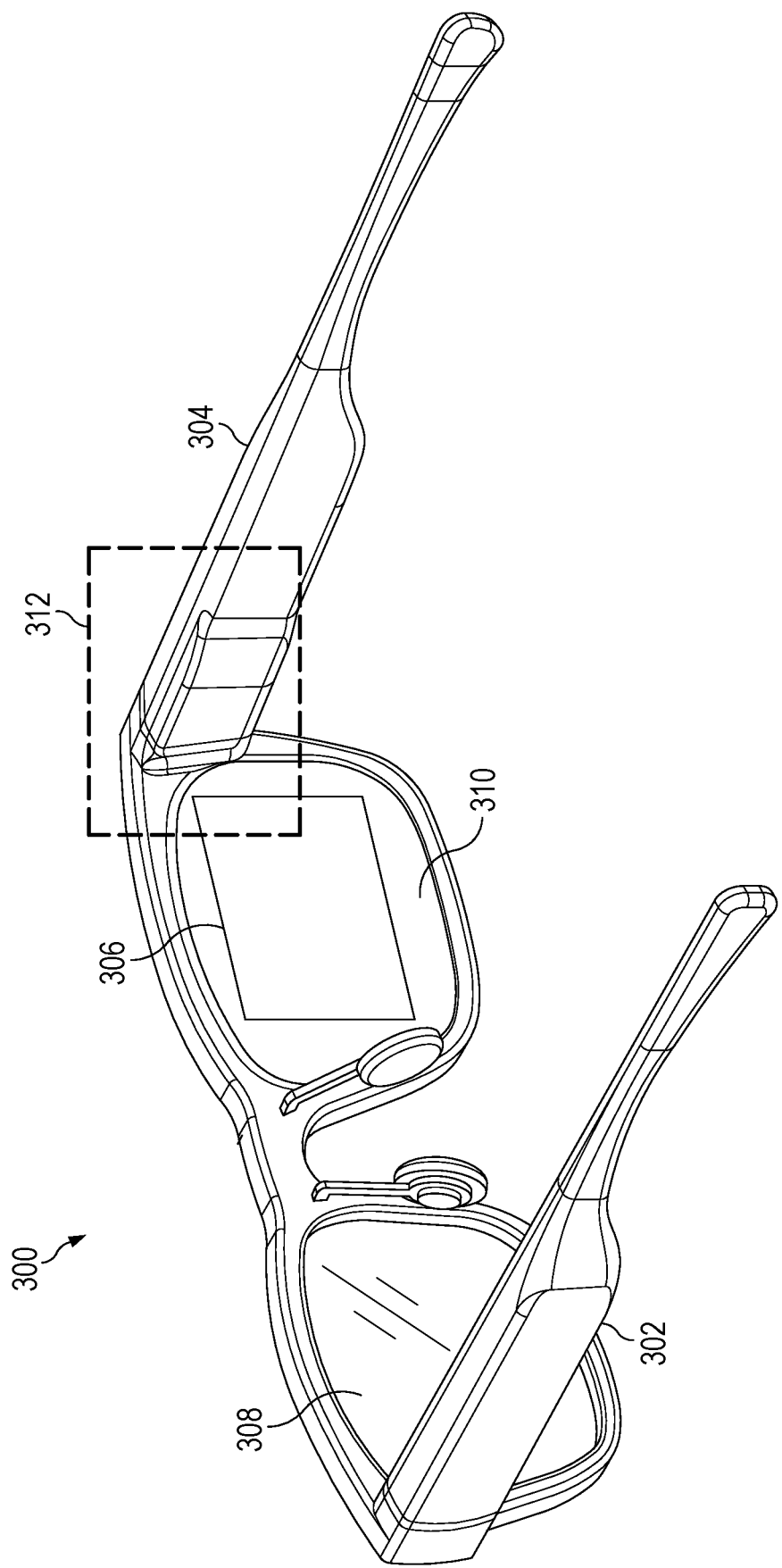
FIGS. 3 and 4 illustrate an example display system employing an augmented reality optical system in accordance with some embodiments.

FIG. 3 illustrates an example display system 300 employing an AR optical system in accordance with some embodiments. The display system 300 has a support structure 302 that includes an arm 304, which houses a projector (e.g., a laser projector, a micro-LED projector, a Liquid Crystal on Silicon (LCOS) projector, or the like). The projector is configured to project images toward the eye of a user via a waveguide (not shown here), such that the user perceives the projected images as being displayed in a field of view (FOV) area 306 of a display at one or both of lens elements 308, 310. In the depicted embodiment, the display system 300 is a near-eye display system in the form of a WHUD in which the support structure 302 is configured to be worn on the head of a user and has a general shape and appearance (that is, form factor) of an eyeglasses (e.g., sunglasses) frame.

The support structure 302 contains or otherwise includes various components to facilitate the projection of such images toward the eye of the user, such as a projector and a waveguide. In some embodiments, the support structure 302 further includes various sensors, such as one or more front-facing cameras, rear-facing cameras, other light sensors, motion sensors, accelerometers, and the like. In some embodiments, the support structure 302 includes one or more radio frequency (RF) interfaces or other wireless interfaces, such as a Bluetooth™ interface, a WiFi interface, and the like. Further, in some embodiments, the support structure 302 further includes one or more batteries or other portable power sources for supplying power to the electrical components of the display system 300. In some embodiments, some or all of these components of the display system 300 are fully or partially contained within an inner volume of support structure 302, such as within the arm 304 in region 312 of the support structure 302. It should be noted that while an example form factor is depicted, it will be appreciated that in other embodiments the display system 300 may have a different shape and appearance from the eyeglasses frame depicted in FIG. 3. It should be understood that instances of the term "or" herein refer to the non-exclusive definition of "or", unless noted otherwise. For example, herein the phrase "X or Y" means "either X, or Y, or both".

One or both of the lens elements 308, 310 are used by the display system 300 to provide an augmented reality (AR) display in which rendered graphical content can be superimposed over or otherwise provided in conjunction with a real-world view as perceived by the user through the lens elements 308, 310. For example, a projection system of the display system 300 uses light to form a perceptible image or series of images by projecting the display light onto the eye of the user via a projector of the projection system, a waveguide formed at least partially in the corresponding lens element 308 or 310, and one or more optical elements (e.g., one or more scan mirrors, one or more optical relays, or one or more collimation lenses that are disposed between the projector and the waveguide or integrated with the waveguide), according to various embodiments.

One or both of the lens elements 308, 310 comprises a lens stack having multiple layers, at least one of which layers includes at least a portion of a waveguide that routes display light received by an incoupler of the waveguide to an outcoupler of the waveguide. The waveguide outputs the display light toward an eye of a user of the display system 300. The display light is modulated and projected onto the eye of the user such that the user perceives the display light as an image. In addition, each of the lens elements 308, 310 is sufficiently transparent to allow a user to see through the lens elements to provide a field of view of the user's real-world environment such that the image appears superimposed over at least a portion of the real-world environment. In certain embodiments, the lens elements 308, 310 include a view control layer disposed on a world side of the waveguide to selectively prevent external light beams from diffracting off of one or more diffraction gratings of the waveguide, as discussed in greater detail elsewhere herein.

In some embodiments, the projector of the projection system of the display 300 is a digital light processing-based projector, a scanning laser projector, or any combination of a modulative light source, such as a laser or one or more light-emitting diodes (LEDs), and a dynamic reflector mechanism such as one or more dynamic scanners, reflective panels, or digital light processors (DLPs). In some embodiments, a display panel of the projector is configured to output light (representing an image or portion of an image for display) into the waveguide of the projector. The waveguide expands the display light and outputs the display light toward the eye of the user via an outcoupler.

The projector is communicatively coupled to the controller and a non-transitory processor-readable storage medium or memory storing processor-executable instructions and other data that, when executed by the controller, cause the controller to control the operation of the projector. In some embodiments, the controller controls the projector to selectively set the location and size of the FOV area 306. In some embodiments, the controller is communicatively coupled to one or more processors (not shown) that generate content to be displayed at the display system 300. The projector outputs display light toward the FOV area 306 of the display system 300 via the waveguide. In some embodiments, at least a portion of an outcoupler of the waveguide overlaps the FOV area 306. Herein, the range of different user eye positions that will be able to see the display is referred to as the eyebox of the display.

Figure 4:
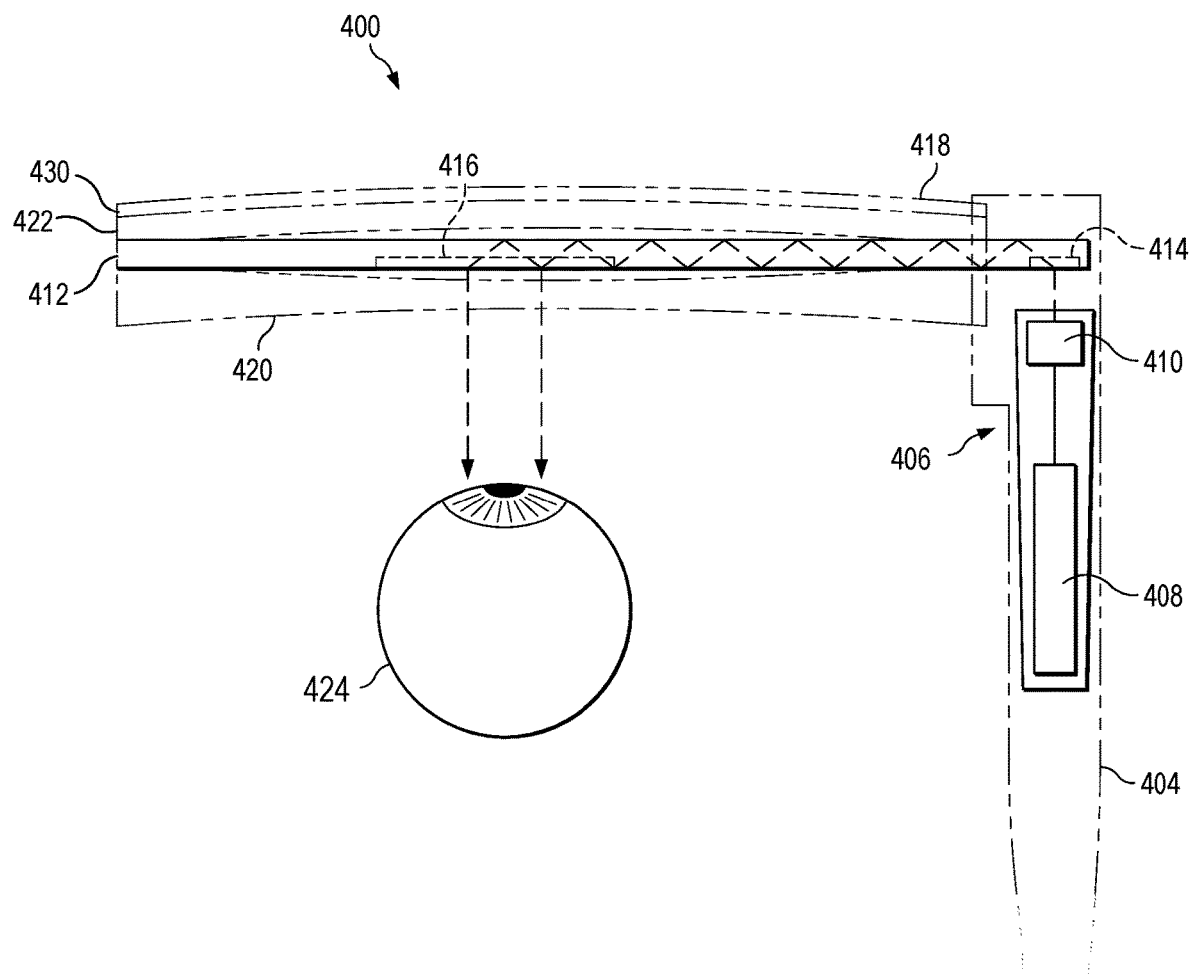

FIG. 4 illustrates a portion of a display system 400 that includes a projection system having a projector 406 and a waveguide 412 with multiple optical paths between an incoupler 414 and an outcoupler 416 of the waveguide 412. In some embodiments, the display system 400 represents the display system 300 of FIG. 3. In the present example, the arm 404 of the display system 400 houses the projector 406, which includes an optical engine 408 (e.g., a display panel), one or more optical elements 410, the incoupler 414, and a portion of the waveguide 412.

The display system 400 includes an optical combiner lens 418, which in turn includes a first lens 420, a second lens 422, and the waveguide 412, with the waveguide 412 embedded or otherwise disposed between the first lens 420 and the second lens 422. The optical combiner lens 418 further includes a view control layer 430 to prevent external light beams, such as those that would otherwise encounter the combiner lens 418 at high angles of incidence with respect to a surface normal of that combiner lens 418, from diffracting off of one or more diffraction structures of the waveguide 412 and thereby prevent diffraction artifacts that would otherwise result from such diffraction.

Light exiting through the outcoupler 416 travels through the first lens 420 (which corresponds to, for example, an embodiment of the lens element 310 of the display system 300 or portion thereof). In use, the display light exiting the first lens 420 enters the pupil of an eye 424 of a user wearing the display system 400, causing the user to perceive a displayed image carried by the display light output by the optical engine 408. The optical combiner lens 418 is substantially transparent, such that at least some light from real-world scenes corresponding to the environment around the display system 400 passes through the view control layer 430, the second lens 422, the waveguide 412, and the first lens 420 to the eye 424 of the user. In this way, images or other graphical content output by the projector 406 are combined (e.g., overlayed) with real-world images of the user's environment when projected onto the eye 424 of the user to provide an AR experience to the user.

The waveguide 412 of the display system 400 includes two diffraction structures: the incoupler 414 and the outcoupler 416. In some embodiments, one or more exit pupil expanders, such as a diffraction grating, is arranged in an intermediate stage between incoupler 414 and outcoupler 416 to receive light that is coupled into the waveguide 412 by the incoupler 414, expand the display light received at each exit pupil expander, and redirect that light towards the outcoupler 416, where the outcoupler 416 then couples the display light out of the waveguide 412 (e.g., toward the eye 424 of the user). In some embodiments, the waveguide 412 is configured to have a peak frequency response at a wavelength of green light, such as around 575 nm, which improves perceptibility of projected images output by the waveguide 412.

The term "waveguide," as used herein, will be understood to mean a combiner using one or more of total internal reflection (TIR), specialized filters, or reflective surfaces, to transfer light from an incoupler (such as the incoupler 414) to an outcoupler (such as the outcoupler 416). In some display applications, the display light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit display light. In some embodiments, a given incoupler or outcoupler is a reflective grating (e.g., a reflective diffraction grating or a reflective holographic grating) that causes the incoupler or outcoupler to reflect light. In the present example, the incoupler 414 relays received display light to the outcoupler 416 via multiple optical paths through the waveguide. In some embodiments, the incoupler 414 redirects a first portion of display light to the outcoupler 416 via a first optical path along which a first exit pupil expander (not shown; implemented as a fold grating in some embodiments) is disposed and redirects a second portion of display light toward the outcoupler 416 via a second optical path along which a second exit pupil expander (not shown; implemented as a fold grating in some embodiments) is disposed. The display light propagates through the waveguide 412 via TIR. The outcoupler 416 then outputs the display light to the eye 424 of the user.

In some embodiments, the projector 406 is coupled to a driver or other controller (not shown), which controls the timing of emission of display light from light sources (e.g., LEDs) of the optical engine 408 in accordance with instructions received by the controller or driver from a computer processor (not shown) coupled thereto to modulate the output light to be perceived as images when output to the retina of the eye 424 of the user. For example, during operation of the display system 400, the light sources of the optical engine 408 output light of selected wavelengths, and the output light is directed to the eye 424 of the user via the optical elements 410 and the waveguide 412. The optical engine 408 modulates the respective intensities of each light source of the optical engine 408, such that the output light represents pixels of an image. For example, the intensity of a given light source or group of light sources of the optical engine 408 corresponds to the brightness of a corresponding pixel of the image to be projected by the projector 406 of the display system 400.

Figure 5:
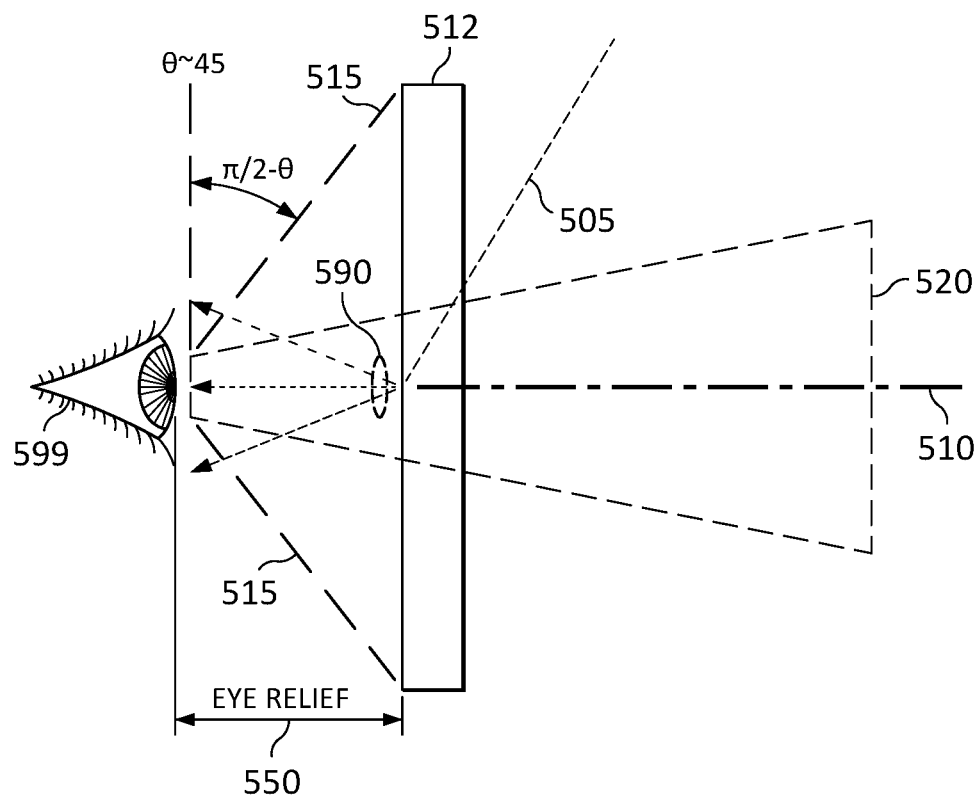
FIG. 5 illustrates an undesirable generation of diffraction artifacts resulting from interaction of an external light ray with a diffraction structure formed on a waveguide.

FIG. 5 illustrates an undesirable generation of diffraction artifacts 590 resulting from interaction of an external light ray 505 with a diffraction structure (not shown) formed on an eye side of a waveguide 512. External light rays approaching an eye 599 of a user within a world FOV 515 are visible to the user. In the depicted scenario, the angle range θ represented by the world FOV 515 is approximately 45° (as measured from the surface normal 510 of the waveguide 512), determined at least in part by a width of the waveguide 512 and an eye relief distance 550 (e.g., between 16 mm and 22 mm in various embodiments of an AR display device). In addition, external light rays are approaching the eye 599 within an AR FOV 520, and are likely to result in diffraction artifacts. Here, the external light ray 505 encounters the diffraction structure formed on the waveguide 512 and diffracts into one or more rainbow diffraction artifacts 590.

Figure 6:
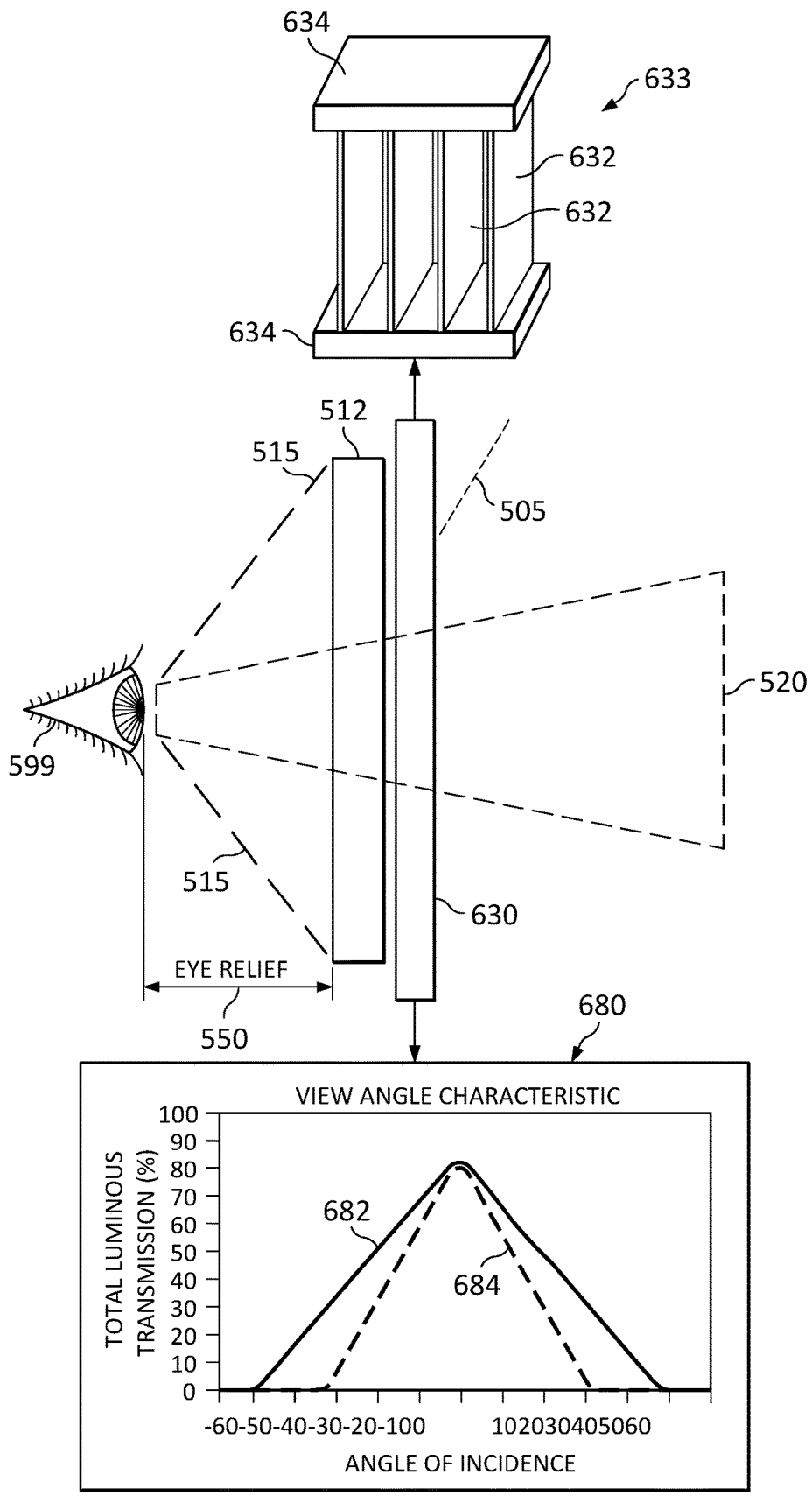
FIG. 6 illustrates a view control layer disposed on an optical waveguide in accordance with some embodiments.

FIG. 6 illustrates a view control layer 630 disposed on the optical waveguide 512 of FIG. 5 in accordance with some embodiments. In the depicted embodiment, the view control layer 630 is comprised of a light control film 633. The light control film 633 includes a series of micro-louvers 632, disposed between two protective layers 634. As can be seen from view angle characteristic analysis 680, the total luminous transmission of the view control layer 630 indicates transmission of a relatively high percentage of light beams encountering the view control layer 630 at low angles of incidence, but transmission of a relatively low percentage of light beams encountering the view control layer 630 at higher angles of incidence. The view angle characteristic analysis 680 shows a transmission curve 682 for a louver film with a relatively small depth/pitch ratio, while a second transmission curve 684 corresponds to that of a louver film with a larger depth/pitch ratio. When the pitch is small, a narrower solid angle of light can transmit through the louvers. When the pitch is large, a larger angle of light can transmit through the louvers without being absorbed. Based on this difference, a threshold angle of incidence may be selected by selecting an appropriate louver depth and pitch for the light control film 633. V In the depicted embodiment, and in contrast with the behavior of external light ray 505 encountering no view control layer in the scenario of FIG. 5, the view control layer 630 absorbs and/or reflects the high-angle external light ray 505, such that it never reaches or interfaces with a diffraction structure of the waveguide 512. In this manner, the rainbow diffraction artifacts 590 of FIG. 5 are prevented. In certain embodiments, a threshold angle of incidence may be selected for the view control layer 630 by configuring a pitch (spatial separation, typically between 90 and 150 μm) and depth of the micro-louvers 632 of the light control film, such that light rays encountering the view control layer 630 at an angle of incidence greater than the selected threshold angle of incidence are prevented by the view control layer 630 from interfacing with diffraction structures of the waveguide 512. For example, extending the depth of the micro-louvers 632 results in a lower threshold angle of incidence (transmitting a smaller range of external light beams to the underlying waveguide), while shallower micro-louvers result in a higher threshold angle of incidence (transmitting a greater range of external light beams to the underlying waveguide).

In certain embodiments, the view control layer 630 may comprise a dielectric stack as an angular filter, either in lieu of or in conjunction with the light control film 633. As used herein, a dielectric stack comprises one or more layers of thin, substantially transparent materials, each with a different refractive index, that are stacked together to form a composite material. In some embodiments, such a dielectric stack is used to control a phase and amplitude of light waves as they pass through the stack. By configuring a thickness and refractive index of each layer in the dielectric stack, the dielectric stack is used to create a thin-film angular filter, to limit a range of angles of incidence from which external light beams (e.g., light beam 505) are allowed to pass through the view control layer 630 and a waveguide 512 towards the eye 599 of the user, similarly to the light control film 633.

Figure 7:
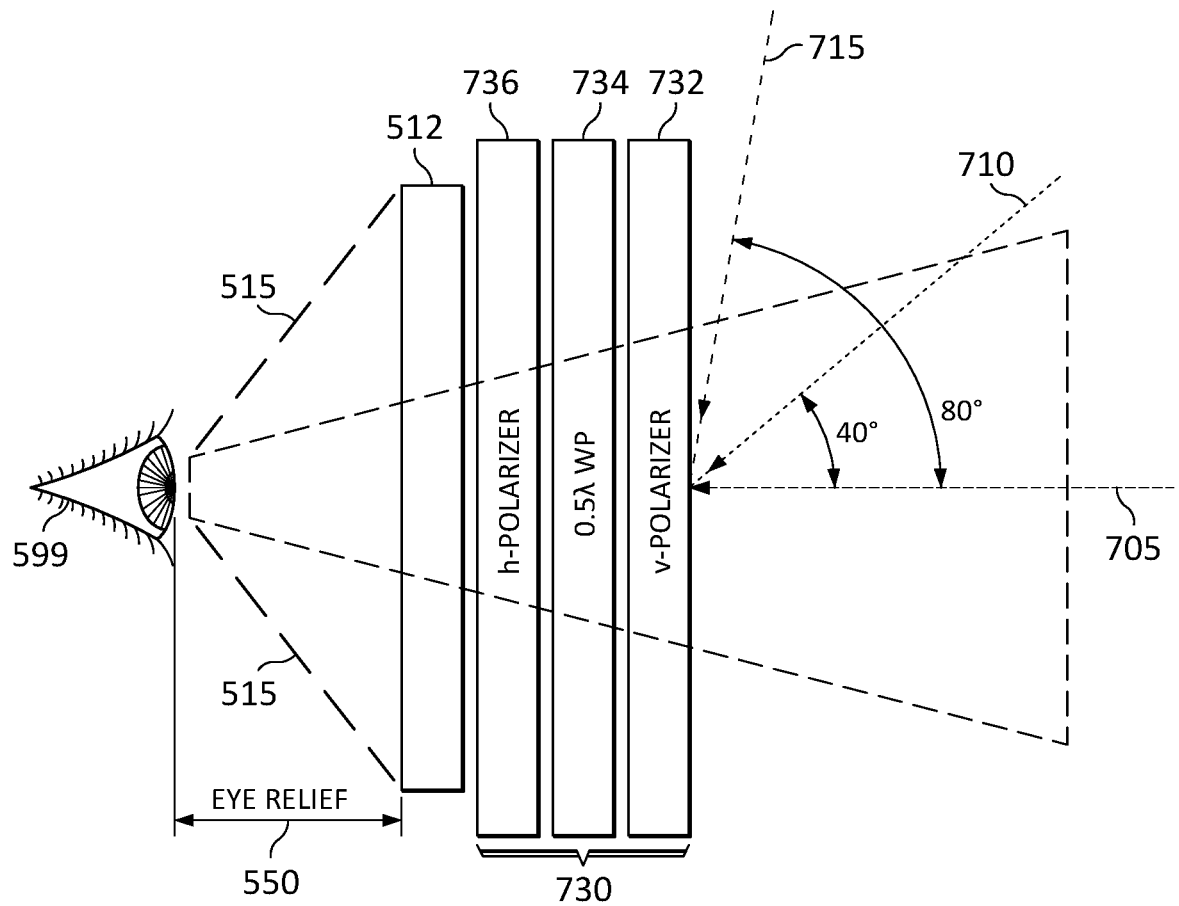
FIG. 7 illustrates another view control layer disposed on an optical waveguide in accordance with some embodiments.

In certain embodiments, the view control layer may comprise a polarization stack. FIG. 7 illustrates a polarization stack view control layer 730 disposed on a world side of the optical waveguide 512 of FIG. 5 in accordance with some embodiments. It will be appreciated that while examples herein are discussed in the context of vertical and horizontal polarization, in various embodiments additional transmission axes may be used, and may further include one or more circular polarizers.

In the depicted embodiment, the view control layer 730 comprises a polarization stack that includes a vertical polarization film 732, a half-wave plate 734, and a horizontal polarization film 736. The view control layer 730 operates as an angular filter to selectively prevent light rays that encounter the view control layer 730 at an angle of incidence greater than a threshold angle of incidence from interfacing with at least one of the one or more diffraction structures. Generally, the transmission of external light beams through the polarization stack of the view control layer 730 is reduced at large angles of incidence due to the half wave plate 734 providing variable retardance of those light beams in accordance with the angle of incidence.

An unpolarized light beam is a light beam in which the electric field oscillates in all planes perpendicular to the direction of propagation. When an unpolarized light beam encounters a polarization film (e.g., vertical polarization film 732 or horizontal polarization film 736), the polarization film will act to polarize the light in a specific plane. Thus, in the depicted embodiment, the vertical polarization film 732 transmits light that is polarized in the vertical plane and reflects (or absorbs) light that is polarized in the horizontal plane, while the horizontal polarization film 732 transmits light that is polarized in the horizontal plane and reflects/absorbs light that is polarized in the vertical plane. In particular, as an angle of incidence of a light beam encountering the polarization stack of view control layer 730 increases, the polarization properties of the light beam will be increasingly affected by the polarization stack, resulting in a greater degree of reflection/absorption and a lower degree of transmission.

In operation, an unpolarized light beam first encounters the vertical polarization film 732, which transmits vertically polarized components of the light beam and reflects/absorbs horizontally polarized components. The now vertically polarized light beam then passes through a half-wave plate, which splits the vertically polarized light beam into two components that are shifted in phase by a quarter wavelength. The circularly polarized light wave then encounters the horizontal polarization film 736, which transmits a horizontally polarized portion of the light wave and reflects/absorbs the remainder. Thus, the view control layer 730 acts to filter the light beam, transmitting only certain components of the beam while reflecting or absorbing the remainder.

FIG. 7 further illustrates three respective unpolarized light beams 705, 710, 715, each of which encounters the view control layer 730 (particularly, the vertical polarization film 732) at a different angle of incidence. In the illustrated example, a first light beam 705 encounters the vertical polarization film 732 at an angle of incidence of 0° (i.e., on-axis with respect to a surface normal of the vertical polarization film 732); a second light beam 710 encounters the vertical polarization film 732 at an angle of incidence of 40°; and a third light beam 715 encounters the vertical polarization film 732 at an angle of incidence of 80°. Each of the light beams 705, 710, 715 is partially transmitted and partially reflected/absorbed by the polarization stack of the view control layer 730 according to the polarization properties of the individual elements 732, 734, 736.

When the first light beam 705 encounters the vertical polarization film 732 at its normal angle of incidence (00), the vertical polarization film 732 transmits the vertically polarized component of the first light beam 705 and reflects the horizontally polarized component. Thus, the vertically polarized component of the first light beam 705 will pass through the film, while the horizontally polarized component is reflected/absorbed externally that is, away from the view control layer 730, from the waveguide 512, and from the user.

When the second light beam 710 encounters the vertical polarization film 732 at its angle of incidence of 40°, the vertical polarization film 732 transmits the vertically polarized component of the second light beam 710 and reflects/absorbs the horizontally polarized component, but the horizontally polarized component will be transmitted at a lower efficiency due to the higher angle of incidence. The vertically polarized component that is transmitted through the vertical polarization film 732 will pass through the half-wave plate 734, while the horizontally polarized component that is reflected back will have a higher degree of horizontal polarization than that of the corresponding horizontally polarized portion of first light beam 705.

When the third light beam 715 encounters the vertical polarization film 732 at its angle of incidence of 80°, the higher angle of incidence will have an even greater effect on the polarization of the light than that discussed above with respect to second light beam 710. The vertical polarization film 732 will transmit a smaller portion of the vertically polarized component of the light wave and reflect/absorb a larger portion, while the horizontally polarized component will be transmitted at a very low efficiency. The vertically polarized component that is transmitted through the film will pass through the half-wave plate, while the horizontally polarized component that is reflected back will have a higher degree of horizontal polarization. Overall, the third light beam 715 will be largely reflected externally by the vertical polarization film 732 due to its high angle of incidence.

Thus, while a light beam at a normal angle of incidence (e.g., light beam 705) is passed through the view control layer 730 with a relatively high transmittance rate. However, because vertically polarized light exiting the vertical polarization film 732 is converted to horizontally polarized light by the half-wave plate 734, oblique light beams (e.g., light beam 715) encounter a very different phase shift from the half-wave plate 734, and are therefore less horizontally polarized when they reach the horizontal polarization film 736 and, in turn, are thereby largely absorbed.

In a manner similar to that described above with respect to the selection of a threshold angle of incidence by configuring parameters of light control film 633 in FIG. 6, in the depicted embodiment of FIG. 7, a threshold angle of incidence may be selected by configuring and or optimization of the half-wave plate 734, such as by selecting a crystal structure or anisotropy of the half-wave plate 734 to control the derivative (slope) of the retardance provided by the half-wave plate 734. For example, to reduce the threshold angle of incidence, the crystal structure or anisotropy would be selected to increase the derivative of the provided retardance.

Figure 8:
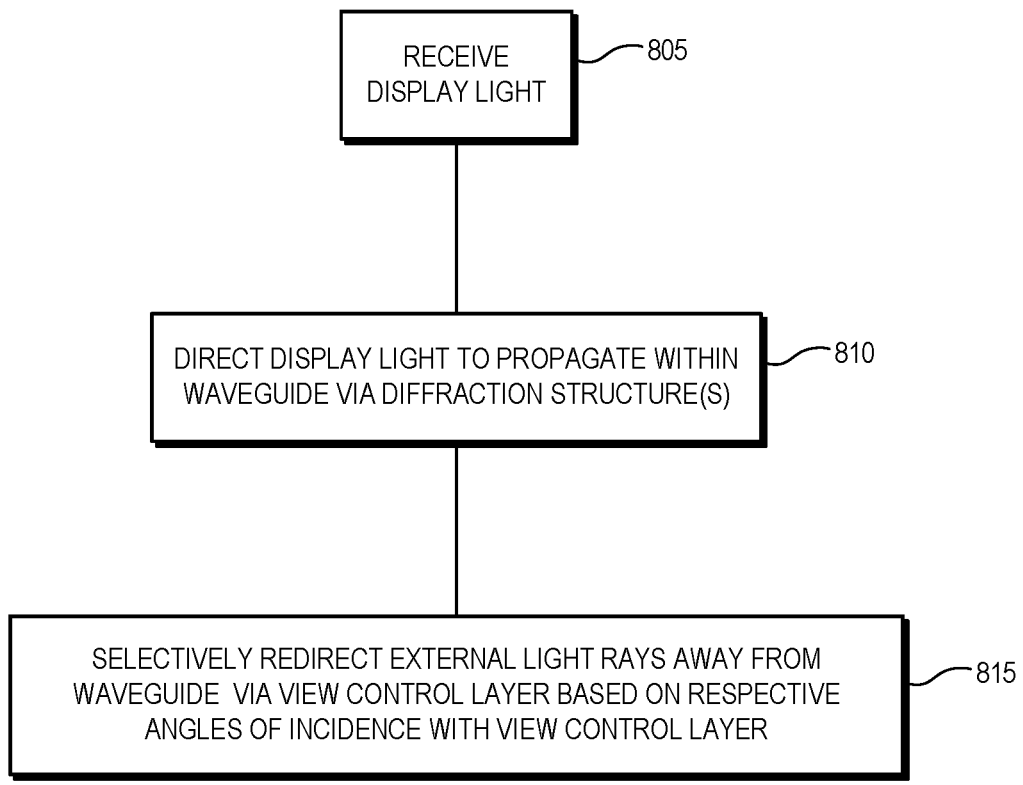
FIG. 8 illustrates a flow diagram of an operational routine in accordance with some embodiments.

FIG. 8 illustrates a flow diagram of an operational routine in accordance with some embodiments, such as may be collectively performed by one or more components of a WHUD device (e.g., display system 300 of FIG. 3 or display system 400 of FIG. 4).

The routine begins at block 805, in which the WHUD device receives display light representative of an image for display. The routine proceeds to block 810.

At block 810, the WHUD device directs the display light to propagate within a waveguide of the WHUD device via one or more diffraction structures. As described elsewhere herein, in certain embodiments such diffraction structures include an incoupler and/or outcoupler diffraction grating formed in or otherwise optically coupled to the waveguide. The routine proceeds to block 815.

At block 815, the WHUD device selectively redirects external light rays away from the waveguide via a view control layer optically coupled to the waveguide. As described in greater detail elsewhere herein, in various embodiments such selective redirection is based on a respective angle of incidence at which the light rays encounter the view control layer, such as if the respective angle of incidence is greater than a threshold angle of incidence associated with the view control layer.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A wearable heads-up display (WHUD) device comprising:
a waveguide comprising one or more diffraction structures, an eye side configured to face an eye of a user, and a world side substantially opposite the eye side; and
a view control layer optically coupled to the world side of the waveguide, the view control layer to selectively prevent light rays from interfacing with at least one diffraction structure of the one or more diffraction structures based on a respective angle of incidence at which the light rays encounter the view control layer being greater than a threshold angle of incidence.

2. The WHUD device of claim 1, wherein the view control layer comprises one or more of a group that includes a light control film, a polarization stack, or a dielectric stack angular filter.

3. The WHUD device of claim 1, wherein the view control layer comprises a micro-louver light control film, and wherein at least one of a pitch and a depth of one or more micro-louvers of the light control film are configured to select a threshold angle of incidence for the view control layer.

4. The WHUD device of claim 1, wherein the view control layer comprises a dielectric stack angular filter that includes a half-wave plate.

5. The WHUD device of claim 1, further comprising one or more lenses coupled to the waveguide.

6. The WHUD device of claim 5, wherein the view control layer is optically coupled to a world side lens of the one or more lenses.

7. The WHUD device of claim 1, wherein the at least one diffraction structure comprises an outcoupler of the waveguide.

8. A method, comprising:
receiving display light representative of an image for display;
directing the display light to propagate within a waveguide via one or more diffraction structures, the waveguide having an eye side configured to face an eye of a user and a world side substantially opposite the eye side; and
selectively preventing, via a view control layer optically coupled to the world side of the waveguide, light rays from interfacing with at least one diffraction structure of the one or more diffraction structures based on a respective angle of incidence at which the light rays encounter the view control layer being greater than a threshold angle of incidence.

9. The method of claim 8, wherein the view control layer comprises at least one light control film.

10. The method of claim 9, further comprising configuring at least one of a pitch and depth of one or more micro-louvers of the light control film to select a threshold angle of incidence for the view control layer.

11. The method of claim 8, wherein the view control layer comprises a polarization stack.

12. The method of claim 8, wherein the view control layer comprises a dielectric stack angular filter.

13. The method of claim 8, wherein one or more lenses are coupled to the waveguide, and wherein the view control layer is optically coupled to a world side lens of the one or more lenses.

14. The method of claim 8, wherein the at least one diffraction structure comprises an outcoupler of the waveguide.

15. A lens stack, comprising:
   a waveguide comprising one or more diffraction structures; and
   a view control layer optically coupled to the waveguide, the view control layer to selectively prevent light rays from interfacing with at least one diffraction structure of the one or more diffraction structures based on a respective angle of incidence at which the light rays encounter the view control layer being greater than a threshold angle of incidence.

16. The lens stack of claim 15, wherein the view control layer comprises one or more of a group that includes a light control film, a polarization stack, or a dielectric stack angular filter.

17. The lens stack of claim 15, wherein the waveguide has an eye side configured to face an eye of a user and a world side substantially opposite the eye side, and wherein the view control layer is optically coupled to the world side of the waveguide.

* * * * *